United States Patent [19]

Henze et al.

[11] Patent Number: 4,930,063
[45] Date of Patent: May 29, 1990

[54] VARIABLE RESONANCE REGULATOR FOR POWER SUPPLY

[75] Inventors: Christopher P. Henze, Minnetonka; Joseph H. Mulkern, St. Paul, both of Minn.

[73] Assignee: Unisys Corporation, Blue Bell, Pa.

[21] Appl. No.: 339,558

[22] Filed: Apr. 17, 1989

[51] Int. Cl.⁵ .............................................. H02M 7/04
[52] U.S. Cl. ..................................... 363/91; 323/251; 323/261; 323/262
[58] Field of Search ............... 323/249, 251, 259, 261, 323/262; 363/90, 91, 126

[56] References Cited

U.S. PATENT DOCUMENTS

| | | | |
|---|---|---|---|
| 2,085,061 | 6/1937 | Aggers | 363/90 |
| 2,316,331 | 4/1943 | Hedding | 323/249 |
| 2,751,545 | 6/1956 | Chase | 323/251 |
| 3,042,848 | 7/1962 | Muchnick et al. | 363/90 |
| 3,686,560 | 8/1972 | Lutterkort | 363/91 |
| 4,323,959 | 4/1982 | Check | 363/40 |
| 4,343,034 | 8/1982 | Wells et al. | 323/251 |
| 4,532,582 | 7/1985 | Freeny | 363/91 |
| 4,631,652 | 12/1986 | Wendt | 363/16 |
| 4,692,851 | 4/1987 | Attwood | 363/16 |

*Primary Examiner*—Peter S. Wong
*Assistant Examiner*—Jeffrey Sterrett
*Attorney, Agent, or Firm*—Arnold L. Albin; Glenn W. Bowen; Robert S. Bramson

[57] ABSTRACT

A voltage regulator particularly adapted to A.C. distributed power systems requiring independent voltage regulation at a plurality of frequency responsive power supply modules energized by a power source at a common alternating frequency is provided by resonant tuning of the regulator circuit. An LC resonant circuit determines the operating frequency of the regulator, and may be operated above or below the excitation frequency. The output voltage is applied to a current amplifier which energizes a linearly variable inductor in accordance with the sensed D.C. output voltage. Changes in the output voltage result in changes in the tuned frequency of the LC circuit and the corresponding corrective change in the output voltage. Circuits providing both voltage and current regulation are described.

22 Claims, 5 Drawing Sheets

VARIABLE RESONANCE REGULATOR FOR POWER SUPPLY

BACKGROUND OF THE INVENTION

1. Field of the Invention

The present invention relates generally to the field of power supply regulation and, more particularly, to an apparatus for deriving a regulated direct current output from a sinusoidal power system and utilizing a variable inductor in a resonant circuit for controlling the regulated output.

2. Description of the Prior art

Pulse-width modulators and switching inverters for conversion of alternating current signals to regulated direct currents are well known. However, such converters suffer from high switching losses, inability to operate at high frequencies, and generation of electromagnetic interference. A number of circuits have been developed which utilize resonant circuit elements in the form of a capacitor-inductor pair to shape the current and voltage waveforms. It is well known that an impulse applied to an inductor-capacitor pair will induce an oscillation in the circuit in which the energy will be transferred back and forth between the inductor and the capacitor. Both the voltage and current have sinusoidal waveforms and are 90° out-of-phase with each other, therefore, both the voltage and current waveforms pass through zero twice each cycle. In the prior art, this phenomenon has been utilized to reduce electromagnetic interference (EMI) and reduce switching dissipation losses by switching the current or voltage off at zero voltage or zero current, allowing the waveforms to return to zero before switching.

Using this theory, two general topologies have developed. Series resonant circuits are comprised of an inductor, capacitor, and load, all in series. Parallel load or parallel resonant circuits have the load in parallel with a series connected capacitor and inductor. Generally, the circuits are controlled by maintaining operation at a frequency near the resonant frequency of the LC pair. The output of the circuit may be varied by varying the operating frequency of the switches or the excitation input. It is a disadvantage of this type of control that the circuit and inductors cannot be optimized for a given frequency, since the frequency is caused to vary for regulating the output voltage or current. Further, if regulation is obtained by varying the input frequency, this will preclude operation of an A.C. distributed power system in which the primary power is distributed at a relatively high voltage and regulated at a plurality of locations at a lower voltage. If the primary power must vary in frequency, it will vary simultaneously the output of all the local supplies and therefore local regulation is not possible. Therefore, it may be seen that if a distributed power system is to be feasible, each of the slave regulators must independently operate at a fixed frequency.

A switching inverter power supply utilizing a resonant circuit is described in U.S. Pat. No. 4,692,851, Harmonic-Resonant Power Supply. This circuit utilizes a switching inverter power supply with pulse-width modulation for regulation, controlled by an inductor resonating with an isolating transformer primary and a capacitor in parallel with the transformer secondary, transformer leakage inductance being included in the resonance circuit. However, this circuit does not provide voltage regulation through utilization of the resonant circuit, and requires that resonance be produced at a frequency of about 5 to 20 times the fixed frequency at which the pulse-width modulator is switched.

A frequency controlled resonant regulator is described in U.S. Pat. No. 4,631,652. A resonating capacitor is coupled to a transformer, forming a series tuned circuit with the leakage inductance between the primary and secondary windings of the transformer. A feedback circuit senses the amplitude of the output voltage and varies the frequency of a voltage controlled oscillator which causes first and second alternately conducting output switching transistors to regulate the output voltage. However, the need for switching transistors means that there will be inherent losses and EMI generation.

A further prior art power supply is described in U.S. Pat. No. 4,323,959, Power Supply with Resonant Inverter Circuit Using Variable Frequency Control for Regulation. Here again, the supply requires the use of an inverter circuit comprising silicon controlled rectifiers which are driven by a variable frequency control signal. The frequency of the control signal is determined by monitoring the power output requirements of the power supply. The supply utilizes the resonant circuit for generating an A.C. waveform of an essentially sinusoidal nature whose frequency is varied in response to the desired power output.

The present invention improves over the prior art by obviating the need for switching circuits, which allows essentially lossless EMI-free regulation. Further, by controlling the regulated voltage as a function of a resonant frequency, while holding the excitation input at a fixed frequency, the circuit components may be optimized for most efficient performance. The present invention obtains its benefits by the desirable feature of varying the resonant frequency of the tuned circuit rather than the operating frequency of the applied voltage.

SUMMARY OF THE INVENTION

In accordance with the present invention, a frequency controlled resonant regulator comprises input means for receiving an alternating current signal at a predetermined frequency. The alternating current signal is applied to the secondary winding of an inductor or control transformer having a primary winding for receiving a control current and a pair of secondary windings connected in series opposition, this construction providing a variable inductance substantially proportional to the magnitude of the control current passing through the primary winding. The secondary winding is also coupled to a load circuit for developing an output voltage to be applied to the load. A capacitor is coupled to the input means and to the second winding and forms a tuned circuit which resonates with the inductance of the transformer to establish an operating point of the regulator at a predetermined frequency and in accordance with the sensed output voltage, thereby permitting the amplitude of the output voltage to be controlled. An amplifier is coupled to the load circuit in response to a sense signal generated by the output voltage for developing a control current that varies the inductance of the control transformer in accordance with the magnitude of the sense signal and thereby regulates the output voltage to an constant value.

In one form, the resonant circuit is comprised of a series resonating capacitor coupled to the secondary wiring and load circuit. In a further preferred embodiment, a resonating capacitor is coupled in series with the power input and the secondary windings and further coupled in parallel with the load circuit.

The present invention is adapted to driving a plurality of frequency controlled resonant regulators from a common alternating current power supply.

DESCRIPTION OF THE PREFERRED EMBODIMENTS

Figure 1:
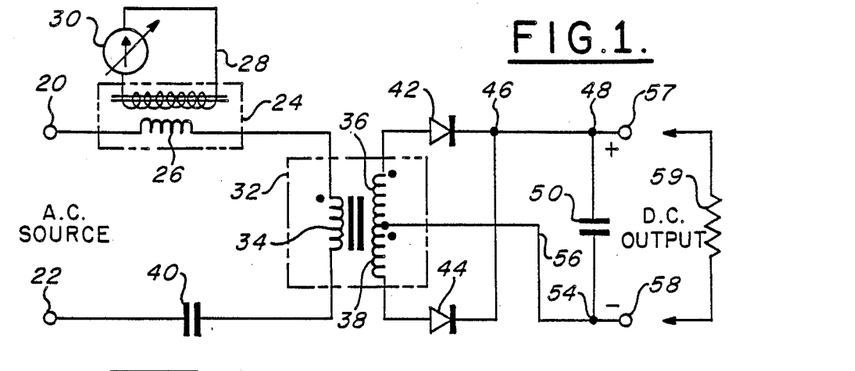
FIG. 1 is an electrical schematic diagram of a simplified version of the regulator showing a series resonant tuned circuit.

Referring now to FIG. 1, the circuit includes a pair of input terminals 20, 22 which are to be connected to a source of alternating current at a preselected frequency. Typically, frequencies in the range of 200 KHz may be applied. A variable inductor 24 and isolation transformer 32 are connected in series with a capacitor 40. Variable inductor 24 is comprised of a primary winding 28 to which is applied a variable D.C. signal from a source 30, and a secondary winding 26 whose inductance is varied in accordance with the DC current flowing through the primary winding 28. Windings 26 and 28 are magnetically decoupled and inductor 24 is of the type wherein the variable inductance is proportional to the DC current in the winding. A suitable inductor is described in U.S. Pat. No. 4,785,389, which is incorporated herein by reference. Transformer 32 is a conventional power transformer for decoupling the alternating current source from the rectified D.C output and may be of the step-down type. A primary winding 34 carries the energizing current from the A.C source at a frequency determined by the resonant frequency of the tuned circuit formed by inductor 24 and capacitor 40. Inductor winding 26 and capacitor 40 are selected to be tuned with respect to the frequency of the A.C. source input, in a manner to be described. In this simplified circuity, the D.C. current source 30 is shown to be independently controlled. This circuit is shown for reference only to indicate the manner of operation of the variable inductor.

The output of transformer 32 appears across a pair of windings 36, 38 connected to rectifiers 42, 44, and node 46, to form a full wave rectifier in a conventional manner. The center tap connection of winding 36, 38 provides a ground return on lead 56 to node 54 which is connected to one end of a filter capacitor 50 and to the negative terminal 58 of the power supply. The positive node 46 connects to capacitor 50 at node 48 and to the positive output 57 of the D.C. supply. A load impedance 59 is coupled to terminals 57 and 58 in a conventional manner. It may be seen that the D.C. output appearing across terminals 57 and 58 may be conveniently controlled by varying the D.C. supply 30 applied to inductor 24, since the power supply is operable at the tuned circuit resonant frequency.

Figure 2:
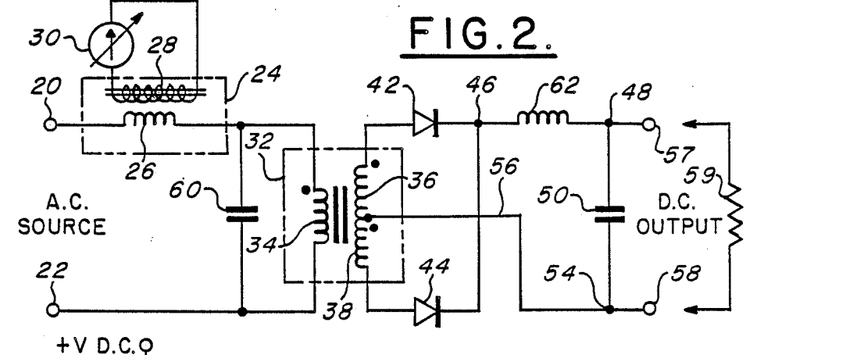
FIG. 2 is an electrical schematic diagram showing a simplified version of the regulator and the parallel load resonant circuit form.

The circuit shown in FIG. 2 is similar to that shown in FIG. 1 and includes the variable inductor 24, transformer 32, capacitor 60 and a rectifier circuit. In FIG. 2, while the secondary winding 26 of variable inductor 24 ramains connected in series with the primary winding 34 of transformer 32 and the A.C. source applied to input terminals 20, 22, the capacitor 60 is coupled in parallel with the winding 34. It will be shown that for optimum performance, the value of capacitor 60 may differ from capacitor 40 and varies with respect to the selected mode of operation and circuit configuration. In FIG. 2, the D.C. filter includes a series inductor 62 coupled between node 46 and node 48, thus providing a conventional low pass filter for D.C. smoothing. Other circuit elements correspond to FIG. 1.

Figure 3:
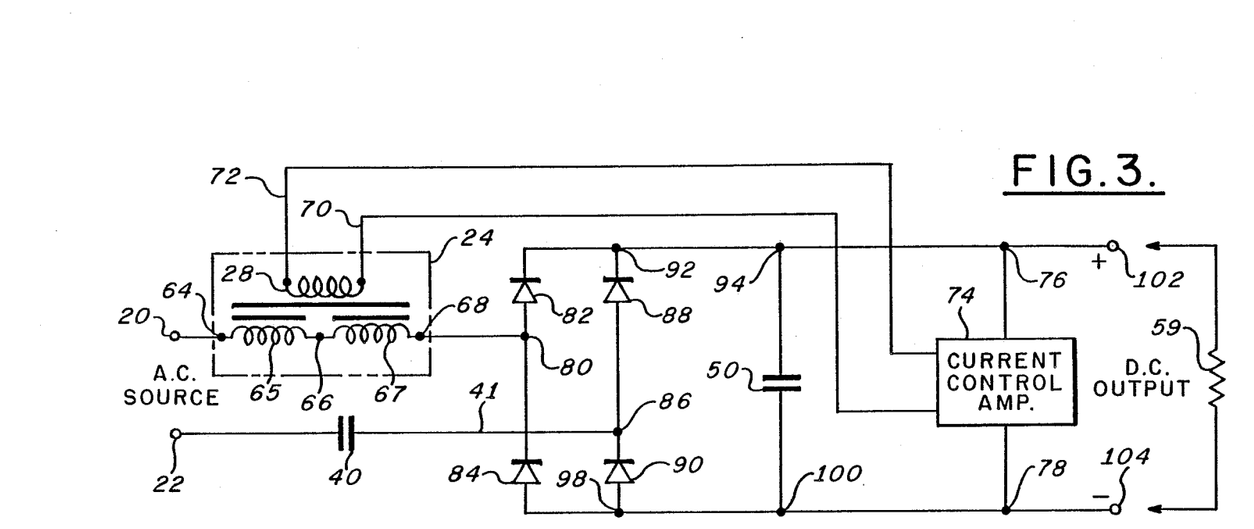
FIG. 3 is a schematic diagram showing a direct coupled series resonant regulator with a variable inductor controlled by a voltage sensor at the regulator output.

The circuit shown in FIG. 3 is a direct coupled power supply wherein the D.C. control for variable inductor 24 is obtained from a current control amplifier 74 which is adapted to sense the D.C. output voltage across terminals 102, 104. Current control amplifier 74 has a sensing element connected to the positive D.C. output at node 76 and to a ground 78. The output of control amplifier 74 appears on leads 70, 72 and is applied to winding 28 of variable inductor 24. Thus, a small change in the voltage across output terminals 102 and 104 produces a large change in current through coil 28 and permits accurate and fast regulation of the circuit. In this circuit, which represents a direct coupled, full wave bridge rectifier, transformer 24 is seen to be comprised of the primary winding 28 and a secondary winding comprised of a pair of series connected coils 65 and 67. The transformer is so constructed and arranged that the magnetic field induced by the D.C. current through winding 28 affects only the magnetizing current of variable inductor 24 and does not appear across terminals 64 and 68. The A.C. source is seen to be applied from input terminal 20 to secondary terminal 64. Coils 65 and 67 are connected to a common juction 66, the windings being oppositely polarized. The output of coil 67 at terminal 68 is applied to node 80 which joins the anode of rectifier element 82 and the cathode of rectifier element 84. The return A.C. source terminal 22 is coupled through series capacitor 40 on lead 41 to a node 86. Node 86 is connected in common to the anode of rectifier 88 and the cathode of rectifier 90. The cathodes of rectifiers 82 and 88 are coupled in common at node 92 and to one side of filter capacitor 50 at node 94.

Node 94 continues to node 76 where the developed D.C. voltage is applied to current control amplifier 74 and then to terminal 102 to provide the positive D.C. output terminal. The anodes of rectifiers 84 and 90 are connected at node 98 and to capacitor 50 at node 100. Node 100 connects to node 78 where it is connected to the return of current control amplifier 74 and to the negative side of the D.C. output at terminal 104.

Figure 4:
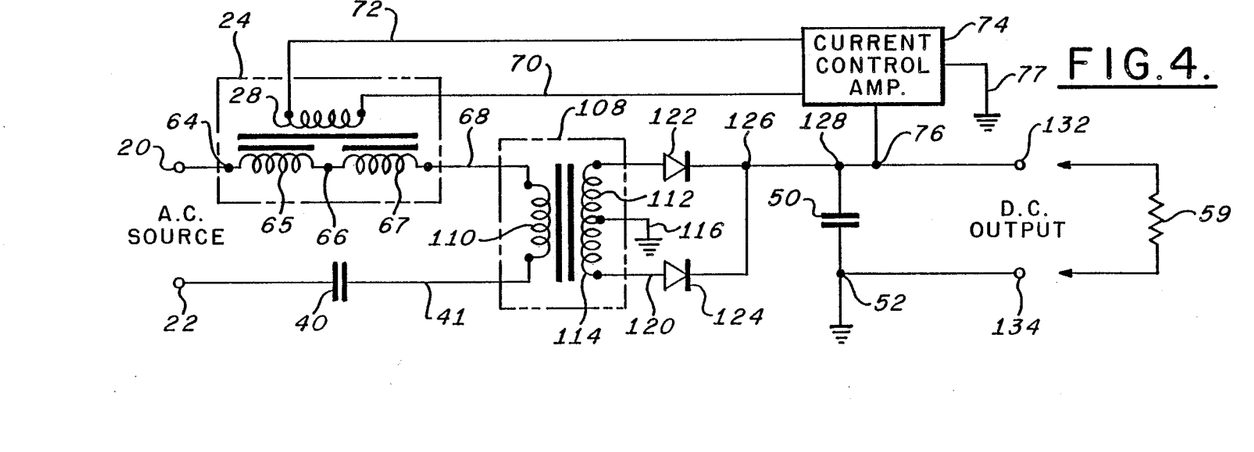
FIG. 4 is a schematic diagram similar to FIG. 3 employing transformer coupling for isolating the input power from the output D.C. current.

The circuit shown in FIG. 4 is similar to that shown in FIG. 2 but utilizes a current control amplifier 74 for control of the current through winding 28 of variable inductor 24. This circuit differs from that shown in FIG. 3 in that an isolation transformer 108 is used to decouple the A.C. source from the D.C. output and a two element full-wave rectifier is provided rather than the four element bridge rectifier of FIG. 3.

Figure 5:
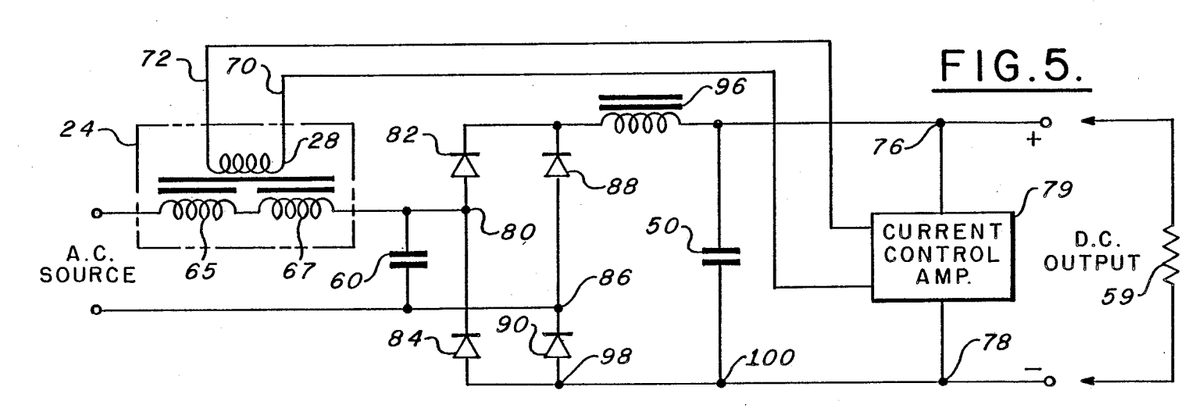
FIG. 5 is an electrical schematic diagram showing a bridge rectifier and control circuit similar to FIG. 3 except that the resonant circuit is of the parallel load configuration.

Referring now to FIG. 5, an alternate embodiment of the invention in which a capacitor 60 is coupled in series with the A.C. source and in parallel with the rectifier is shown.

Figure 6:
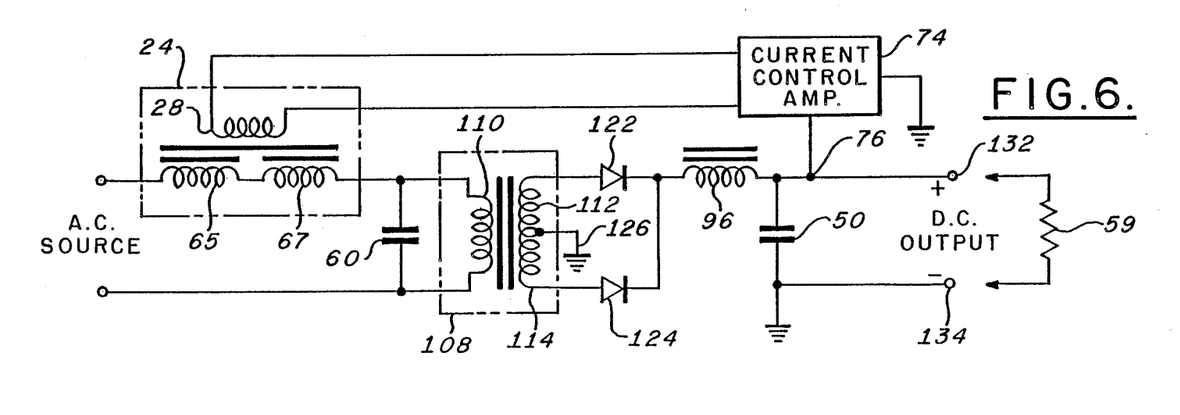
FIG. 6 is a circuit as in FIG. 5 utilizing transformer isolation.

In a like manner, FIG. 6 shows the parallel capacitor connection utilizing an isloation transformer 108. Transformer 108 includes a secondary winding 112, 114 which is connected to rectifiers 122 and 124 to produce positive pulses at node 125 and negative pulses on conductor 126, which may be grounded. After being filtered by a direct current filter circuit which includes a series inductor 96 and a parallel capactior 50, direct current is produced at terminals 132 and 134 and made available to a load impedance 59.

Figure 7:
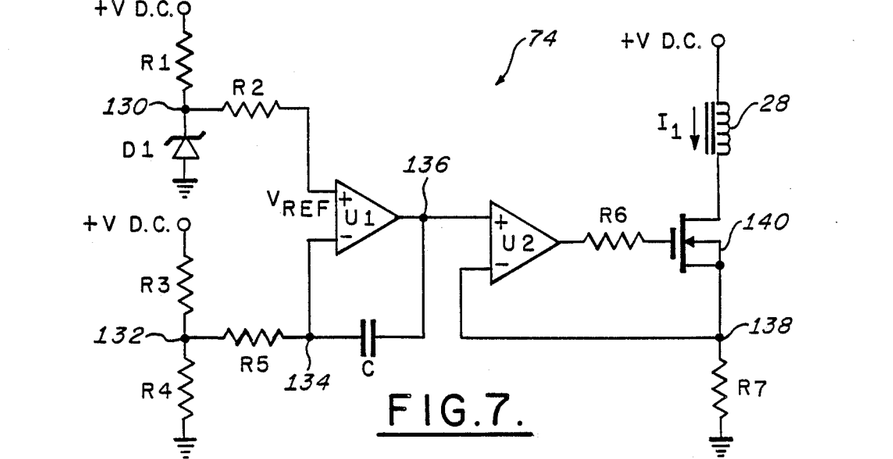
FIG. 7 is a detailed electrical schematic of connections showing the components of an amplifier for sensing the load voltage and deriving a control current for the variable inductor.

The current control amplifier 74 may include and type of voltage or current sensing circuit and any suitable amplifier circuit. Thus, current may be sensed may be means of a series impedance or inductive pick-up, while voltage may be sensed by means of a direct connection to node 76. A suitable circuit is shown in FIG. 7, but this is meant to be exemplary and not limiting. In this case, the sensed voltage +VDC is applied directly to a voltage divider comprised of resistors R1 and R2 to develop a suitable bias voltage for a reference diode D1, which may be of the Zender diode type. The Zener diode is well known and comprises a semiconductor diode connected in the circuit in the manner which is the reverse of the usual polarity. It then operates to maintain a constant voltage at node 130. The voltage at node 130 is then applied through a resistor R2 to provide a reference voltage source $V_{REF}$ to the non-inverting input of a differential amplifier U1. The D.C. output voltage+VDC is also applied through a divider network R3, R4 to a series impedance R5. R5 is connected at node 134 to one end of a shunt capacitor C whose other end is connected to the output terminal of amplifier U1 at node 136. Node 134 is also coupled to the inverting input of amplifier U1. The signal at node 136 is coupled to the non-imverting input of a further amplifier U2. The inverting input of amplifier U2 is connected to a node 138 at the junction of a shunt resistor R7 and the current path to the source electrode of a MOSFET transistor 140. The gate of FET 140 is coupled through resistor R6 to the output terminal of amplifier U2. The D.C. voltage+VDC source is also applied to one end of the primary coil 28 of variable inductor 24 and coupled to feed the drain electrode of FET 140.

The operation of the current amplifier is as follows: The control circuit amplifier 74 is basically a voltage-to-current converter. The D.C supply voltage applied to node 134 is compared to a reference voltage developed from Zener diode D1. Zener diode D1 is selected to provide a voltage proprortional to the desired regulated output voltage. A difference between the voltages applied to amplifier U1 will cause more or less current (depending on the direction of error) to be applied to current amplifier U2 to drive FET amplifier 140. This results in a change in the current in winding 28 and in the inductance of variable inductor 24, which is proportional to the change in current. The change in the value of inductance causes, in turn, a change in the resonant frequency of the series of parallel LC circuit. It will be shown that the operating point of the circuit is a function of the resonant frequency, and hence the output voltage is caused to change in a sense to correct for the voltage difference. The resistive networks set the gain of the error amplifier. While shown as resistors for simplicity, in practice resistors R3, R4, R5 may represent resistors, capacitors, or RC networks, depending on the required frequency compensation for providing a frequency response commensurate with the output filter of the rectifier circuit. Actual values of these components will also depend on other factors such as layout and specific amplifier characteristics, and may be determined, as is well known in the art, from manufacture's specification sheets.

The circuits of FIGS. 1–6 are controlled by operating the circuit at a frequency near the resonant frequency of the LC pair. As this frequency is varied, the output of the circuit varies. The circuits can be operated both below and above the resonant frequency. In the prior art, the normalized frequency is varied by changing the operating frequency of the A.C source or, in a switching type supply, varying the operating frequency of the switches. The disadvantage here is that the circuit and magnetics cannot be optimized for a given frequency since the frequency is caused to vary in order to regulate the output voltage. The present invention employs both series resonant and parallel resonant regulating rectifiers. These circuits vary the frequency by changing the resonant frequency while holding the A.C. excitation input at a fixed frequency. This is accomplished by varying the inductance value using a linearly variable inductor. The linearly variable inductor utilizes two superimposed toroidal cores with opposing direction windings, and a common control winding. As noted in the Kislowski reference of U.S. Pat. No. 4,631,652, the value of inductance varies substantially linearly with the magnitude of the current through the control winding.

Figure 8:
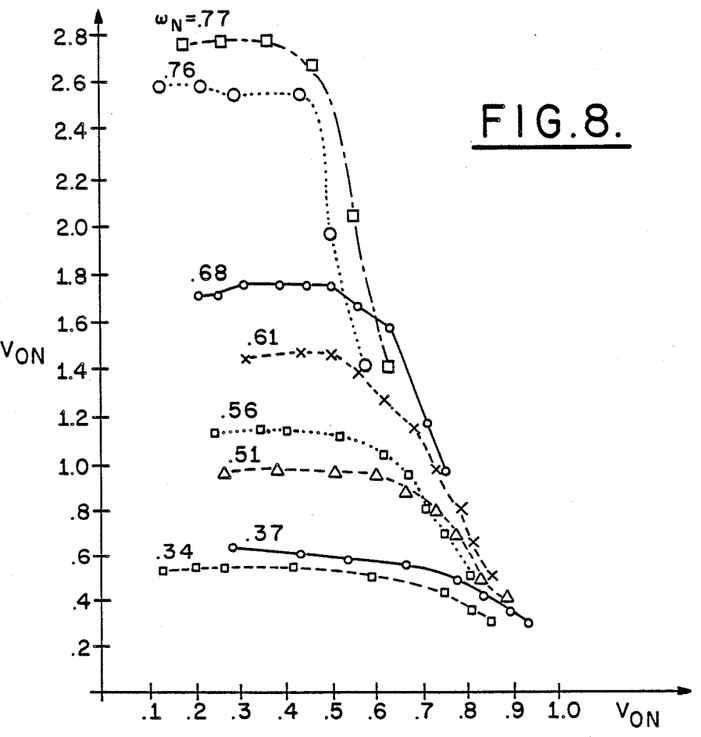
FIG. 8 is a family of curves for a series resonant rectifier circuit showing output current versus output voltage for a preferred range of operating frequencies.

Referring now to FIG. 8, there is shown a series of operating curves for a series resonant rectifier circuit operated below the resonant frequency. The operating curves for this circuit topology show the output voltage $V_{ON}$ in relation to output current $I_{ON}$ with normalized frequency $\omega_N$ (operating frequency divided by resonant frequency, fn=fs/fo) as a parameter. Both the current axis and voltage axis are shown in terms of normalized values. The curves shown are the result of tests over a range of normalized operating frequency from 0.34 to 0.77. It may be seen that for values of $V_{ON}<0.5$ that the current is nearly constant as the voltage is varied over a substantial range. Note that the greatest normalized frequency results in the maximum current output, which occurs when a minimum bias current is applied to the variable inductor. Thus, if all control power is lost due to short circuit conditions on the output, the power supply will be subjected to high demands of current. However, by predetermining the maximum inductor value, in the absence of bias current, the peak current under short circuit conditions may be limited to a safe design value. Similarly, if a rectifier diode fails in a short circuit mode, the input current will be limited accordingly. Typically, the series resonant circuit will be designed to provide a 10 to 1 variation in inductance value.

Figure 9:
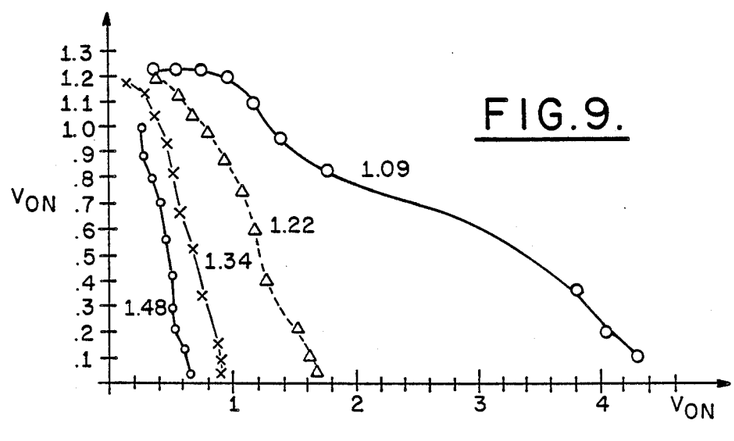
FIG. 9 is a family of curves for a parallel load resonant amplifier showing output current versus output voltage with operating frequency as a parameter.

Referring now to FIG. 9, there is shown a normalized family of operating curves for the parallel resonant circuit. It has been found that the parallel resonant circuit provides a higher ripple amplitude, therefore requiring an additional inductor 96 in the filter circuit. Further, the closed-loop compensation of the current control amplifier 74 will be more complex and require more components because the rectifier output filter has at least two poles. However, from FIG. 9 it may be seen that the parallel load circuit has the output characteristics of a voltage source, rather than a current source as in the series resonant circuit; a much lower range of inductor value changes is required to control the output. Typically, a parallel resonant load circuit will require as little as 3 to 1 variation in inductance. Further, if the output is short circuited and control power therefore lost, the output current will not only be inherently limited, but will be limited to a minimum value which is less than the nominal operating current. FIG. 9 shows the operating conditions with an A.C. sine-wave 200 KHz power source. These values were obtained with the circuit operating above the resonant frequency. Normalized current $I_{ON}$ versus normalized output voltage $V_{ON}$ is shown with normalized frequency fn as a parameter. The curves were taken over range of 1.09 through 1.48 normalized frequency. Only small variations in frequency are needed to maintain a relatively constant voltage for a wide swing of current. As noted above, with the circuit operating above resonance, the minimum output power occurs when the normalized operating frequency is highest (fn=1.09); at this point minimum bias current is required for the variable inductor. A drawback to this type of circuit is the peak input current. It may become quite large, due to the large value of resonant capacity in shunt with the power lines. Hence, the required excitation circuit has to supply a much higher current overhead.

Figure 10:
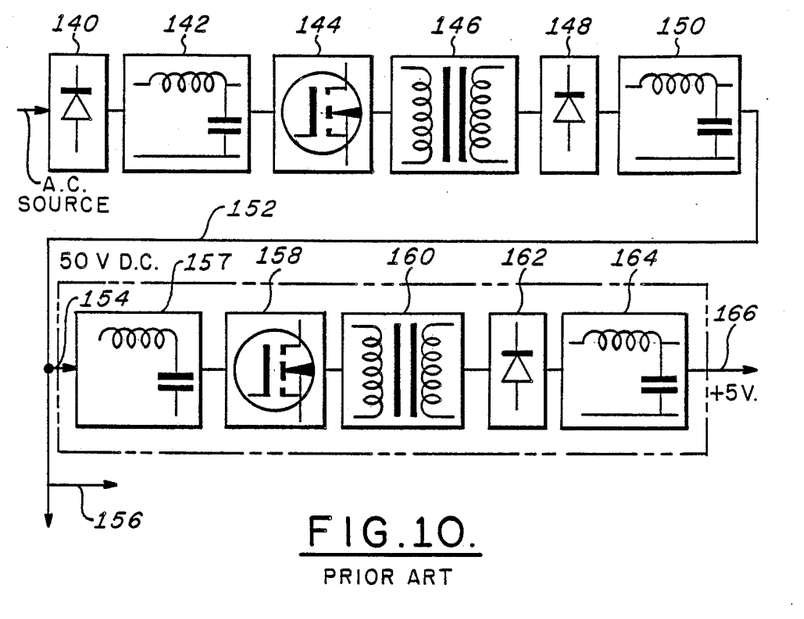
FIG. 10 is a schematic block diagram of a prior art distributed power processing system.

The present invention is well adapted to use in an A.C. distributed power system. FIG. 10 shows a prior art distributed system comprising an A.C. power source, an imput rectifier 140 and an imput filter 142 which provides a high voltage D.C. output. This voltage is applied to a switching amplifier 144 which energizes a step down transformer 146. While it is desired to distribute power to a number of operating circuits requiring independent frequency regulation, the relatively high current requirements mitigate against transmission at the low D.C. operating voltages which will ultimately be required. Therefore, the initial distribution is done at an intermediate transmission voltage. Step down transformer 146 provides a reduced voltage to a rectifier 148 which in turn supplies a rectifier filter 150 to provide the intermediate D.C. transmission level on lead 152 to operating circuits 154 and 156 which are representative of a plurality of such circuits. The intermediate transmission D.C. voltage on lead 154 is applied to a further filter 156, required to attenuate EMI emissions and a second switching amplifier 158. The output of switching amplifier 158 is applied to a step down tansformer 160 which provides an A.C. voltage suitable for deriving the desired +5V output. The A.C. voltage from transformer 160 is applied to rectifier 162 and filtered through D.C. filter 164 to provide the desired output at lead 166. In a similar fashion, the voltage on lead 156 is filtered, switched to generate a suitable reduced A.C. value, and rectified to provide the desired D.C. output. It may be seen that since each individual power module is required to be independently regulated, the system cannot rely on varying the frequency of the A.C. source, but must vary the switching frequency of switch 158 in order to vary the operating frequency of an individual power supply module.

Figure 11:
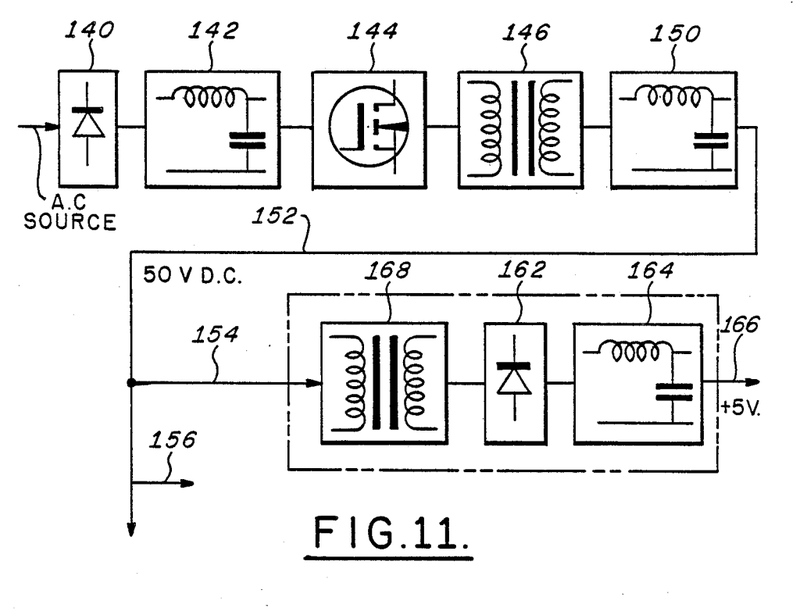
FIG. 11 is a schematic block diagram of a distributed power processing system employing a plurality of resonant circuit regulators as in the present invention.

Referring now to FIG. 11, it may be seen that the initial distribution elements 140, 142, 144, 146 and 150 are similar to the prior art. However, the low voltage switching elements of the prior art are not required since the power supply module of FIG. 11 is capable of independently regulating the output voltage with a constant A.C. source frequency. An EMI filter is also unnecessary since no switching is performed at the regulator level.

It may be seen that the present invention provides the following advantages:
1. No power transistors and associated drive and isolation circuits are required on the primary side of the transformer, as with DC—DC converters.
2. Pulse-width or frequency modulation is not required for regulation.
3. A voltage controlled current amplifier is easily fabricated to provide closed loop control.
4. The variable resonance filter provides very efficient regulation at high frequency without incurring the switching and conduction losses of the prior art switching regulators.
5. The variable inductor provides inherent isolation between the input and output circuits.
6. Control power may be developed directly from the output voltage, therefore an internal bias power source is not required.
7. The maximum inductor value may be fixed to limit the maximum output current during short circuit conditions, even if all control power is lost.
8. Operation with high frequency A.C. excitation permits substantial reduction in the volume and weight of the circuit components.
9. Operation at fixed frequency A.C. excitation affords capabilities for regulation of a distributed A.C. power system.
10. The regulator is inherently free from EMI generation.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. A frequency controlled resonant regulator comprising:
input means for receiving an alternating current signal operable at a predetermined frequency,
a control transformer having a primary winding and at least one pair of secondary windings, said secondary windings of said at least one pair being connected in series opposition, and said transformer being constructed and arranged to have a variable inductance that is substantially linearly proportional to a D.C. control current through said primary winding, a load circuit for providing a regulated direct current power source, said secondary windings having a first end coupled to said input means and a second end coupled to said load circuit, resonating capacitor means coupled to said input means and to said secondary windings for forming a tuned circuit with the inductance of said transformer, and control means coupled to said load circuit for sensing the output of said regulator and for providing said control current to said transformer which thereby varies said inductance in order to regulate the output of said regulator in response to said output.

2. A frequency controlled resonant regulator as set forth in claim 1, further comprising:
said resonating capacitor means coupled in series with said secondary windings, said load circuit, and said input means.

3. A frequency controlled resonant regulator as set forth in claim 2, wherein said load circuit comprises a plurality of unidirectional conducting circuit elements that are coupled intermediate said resonating capacitor means and said secondary windings for providing a unidirectional output current when energized by said alternating current signal,
said control means is responsive to a voltage across said load circuit,
said control means for providing a control current comprises means for providing a reference voltage, means for comparing said reference voltage and said voltage across said load circuit, and means for deriving a current proportional in amplitude and polarity to the difference thereof, and
means for applying said derived current to said primary winding.

4. A frequency controlled resonant regulator as set forth in claim 3, said load circuit further comprising a further transformer having a primary winding and a secondary winding for isolating said alternating current signal from said unidirectional output current, said primary winding of said further transformer having a first end series coupled to said resonating capacitor and a second end series coupled to one of said secondary windings of said control transformer, and said secondary winding of said further transformer coupled to energize said unidirectional conducting circuit elements.

5. A frequency controlled resonant regulator as set forth in claim 4, wherein said alternating current signal is operative at about 200 KHz and tuned circuit is operative at a frequency above the alternating current operative frequency.

6. A frequency controlled resonant regulator as set forth in claim 4, wherein said tuned circuit is operative in a range of 34 percent to 77 percent of said alternating current frequency.

7. A frequency controlled resonant regulator as set forth in claim 2, said load circuit further comprising filter means coupled to a plurality of unidirectional circuit elements and an output means for providing a direct current output substantially free of alternating frequency components and for providing said control current.

8. A frequency controlled resonant circuit as set forth in claim 7, said filter means comprising at least a first reactive component coupled in parallel with said output means.

9. A frequency controlled resonant regulator as set forth in claim 8, said filter means further comprising at least a second reactive component coupled in series with said unidirectional circuit elements in said output means and in series with said output means.

10. A frequency controlled resonant regulator as set forth in claim 9, said unidirectional circuit element means comprising a full wave rectifier.

11. A frequency controlled resonant regulator as set forth in claim 10, said unidirectional circuit element means comprising a bridge rectifier.

12. A frequency controlled resonant circuit as set forth in claim 11, said first reactive component comprising a capacitor and said second reactive component comprising an inductor.

13. A frequency controlled resonant regulator as set forth in claim 1, further comprising:
said resonating capacitor coupled in series with said input means and said secondary windings, and further coupled in parallel with said load circuit, said load circuit comprising a plurality of unidirectional circuit elements for providing a unidirectional output current when energized by said alternating current signal.

14. A frequency controlled resonant regulator as set forth in claim 13, said load circuit further comprising an isolation transformer having a primary winding and a secondary winding coupled thereto, for isolating said alternating current signal from said output current, said primary winding of said isolation transformer coupled in parallel with said resonating capacitor and said secondary winding thereof coupled to energize said inidirectional circuit elements.

15. A frequency controlled resonant regulator as set forth in claim 14, wherein said tuned circuit is operative in a range of 9 to 45 percent above said alternating current frequency.

16. A frequency controlled resonant regulator as set forth in claim 14, wherein said alternating current signal is operative at about 200 KHz and said tuned circuit is operative at a frequency above the alternating current operative frequency.

17. A frequency controlled resonant regulator as set forth in claim 14, said load circuit further comprising filter means coupled to said unidirectional circuit elements and an output means for providing a direct current output substantially free of alternating frequency components and for providing said control current.

18. A frequency controlled resonant circuit as set forth in claim 17, said filter means comprising at least a first reactive component coupled in parallel with said output means.

19. A frequency controlled resonant regulator as set forth in claim 18, said filter means further comprising at least a second reactive component coupled in series with said unidirectional circuit elements and in series with said output means.

20. A frequency controlled resonant regulator as set forth in claim 19, said unidirectional circuit element means comprising a full wave rectifier.

21. A frequency controlled resonant regulator as set forth in claim 20, said unidirectional circuit element means comprising a bridge rectifier.

22. A frequency controlled resonant circuit as set forth in claim 21, said first reactive component comprising a capacitor and said second reactive component comprising an inductor.

* * * * *